United States Patent
Uemura (10) Patent No.: US 6,667,755 B2
(45) Date of Patent: Dec. 23, 2003

(54) METHOD OF AND APPARATUS FOR RECORDING IMAGE BY EXPOSURE TO LIGHT BEAMS

(75) Inventor: Takayuki Uemura, Odawara (JP)

(73) Assignee: Fuji Photo Film Co., Ltd., Kanagawa-ken (JP)

(*) Notice: Subject to any disclaimer, the term of this patent is extended or adjusted under 35 U.S.C. 154(b) by 0 days.

(21) Appl. No.: 09/864,269

(22) Filed: May 25, 2001

(65) Prior Publication Data
US 2001/0048460 A1 Dec. 6, 2001

(30) Foreign Application Priority Data
May 31, 2000 (JP) ............................. 2000-161649

(51) Int. Cl.$^7$ ................................................ B41J 2/435
(52) U.S. Cl. ........................................ 347/234; 347/248
(58) Field of Search ............................... 347/233, 234, 347/235, 237, 247, 248, 41; 359/204

(56) References Cited

U.S. PATENT DOCUMENTS

| 5,300,956 A | * | 4/1994 | Ohta et al. ................. 347/234 |
| 5,453,777 A | | 9/1995 | Pensavecchia et al. ..... 347/234 |
| 5,686,944 A | * | 11/1997 | Takagi et al. ................. 347/41 |
| 6,115,165 A | * | 9/2000 | Tada .......................... 359/204 |
| 6,137,616 A | * | 10/2000 | Inagaki et al. .............. 359/204 |

\* cited by examiner

*Primary Examiner*—Hai Pham
(74) *Attorney, Agent, or Firm*—Sughrue Mion, PLLC (57) ABSTRACT

Two-dimensional image data is divided into two-dimensional image data of numbers of main scanning lines depending on intervals between laser beams. While effective signals are high in level, the divided two-dimensional image data simultaneously start being outputted as effective image data. While effective signals are low in level, the two-dimensional image data are made ineffective. In this manner, recording ranges covered by the laser beams are adjusted to record a two-dimensional image. A high-quality two-dimensional image can thus be recorded at a high speed in a desired recording position on a photosensitive medium by exposure to light beams with an inexpensive arrangement without the need for a highly accurate adjusting process and a highly accurate adjusting mechanism.

9 Claims, 7 Drawing Sheets

METHOD OF AND APPARATUS FOR RECORDING IMAGE BY EXPOSURE TO LIGHT BEAMS

BACKGROUND OF THE INVENTION

1. Field of the Invention

The present invention relates to a method of and an apparatus for recording a two-dimensional image on a photosensitive medium by exposure to light beams which are emitted from a plurality of light sources arrayed in an auxiliary scanning direction and applied to scan the photosensitive medium in a main scanning direction and the auxiliary scanning direction.

2. Description of the Related Art

There have been used exposure recording apparatus in which a drum with a photosensitive medium mounted on its outer circumferential surface is rotated about its own axis in a main scanning direction and the photosensitive medium is scanned with a laser beam that has been modulated by an image to be recorded, in an auxiliary scanning direction perpendicular to the main scanning direction, for thereby recording a two-dimensional image on the photosensitive medium.

One type of such exposure recording apparatus has a plurality of light sources arrayed in the auxiliary scanning direction which can simultaneously be energized to record a large-size image at a high speed (see Japanese laid-open patent publication No. 7-23195). If the positions of images produced by adjacent ones of the light sources are inaccurate relatively to each other, then junctions between recording ranges of the light sources suffer from striped image irregularities.

According to the above conventional exposure recording apparatus, if the positions of images produced by the light sources are misaligned in the main scanning direction, then such a positional misalignment is corrected by delaying or advancing the recording times of the light sources in the main scanning direction by a certain relative period. If the positions of images produced by the light sources are misaligned in the auxiliary scanning direction, then times to start recording images in the auxiliary scanning direction by the respective light sources are adjusted by the number of pixels that is obtained by rounding off the image position misalignment, for thereby correcting a misalignment that is equal to or greater than one half of a pixel.

With the conventional exposure recording apparatus, however, since the times to start recording images in the auxiliary scanning direction by the respective light sources are individually adjusted to record the images with the same number of scanning lines, if the times to start recording images in the auxiliary scanning direction by the respective light sources that are located in recording start positions in the auxiliary scanning direction are adjusted, then the overall position of the recorded two-dimensional image is displaced in the auxiliary scanning direction.

SUMMARY OF THE INVENTION

It is a general object of the present invention to provide a method of and an apparatus for recording a high-quality two-dimensional image at a high speed in a desired recording position on a photosensitive medium by exposure to light beams with an inexpensive arrangement without the need for a highly accurate adjusting process and a highly accurate adjusting mechanism.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
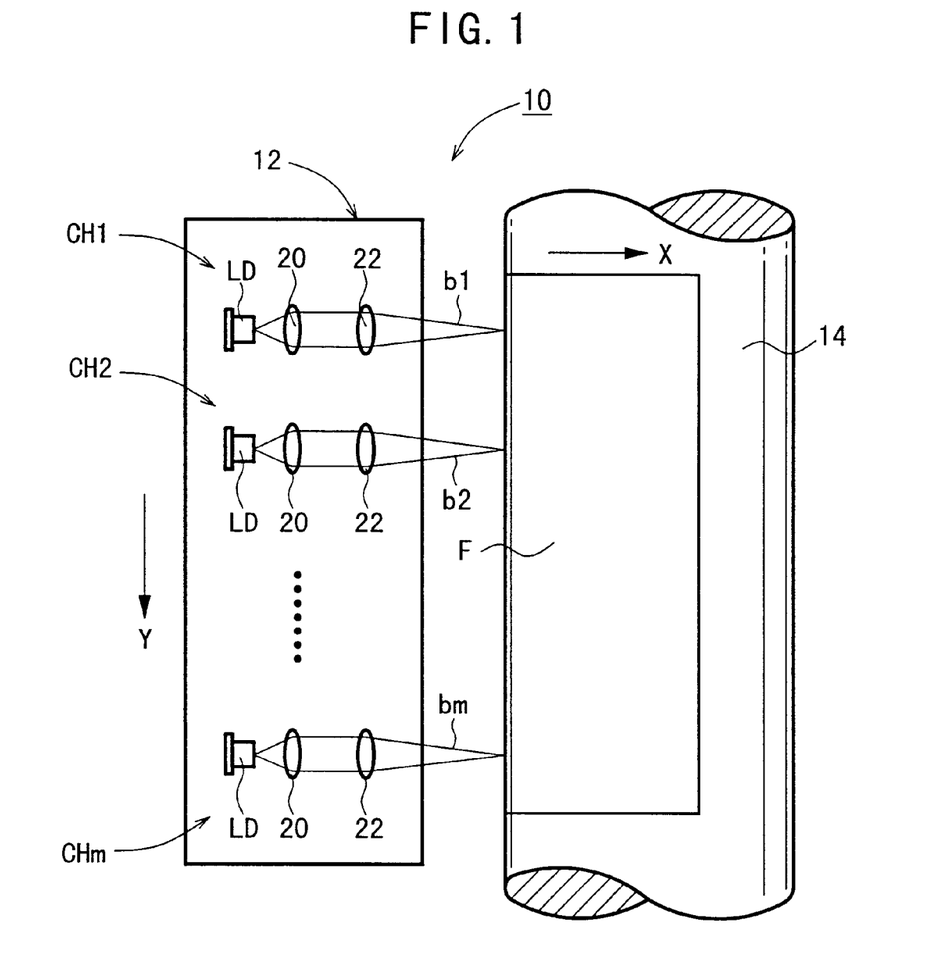
FIG. 1 is a plan view of a laser beam recording apparatus according to an embodiment of the present invention.
Figure 2:
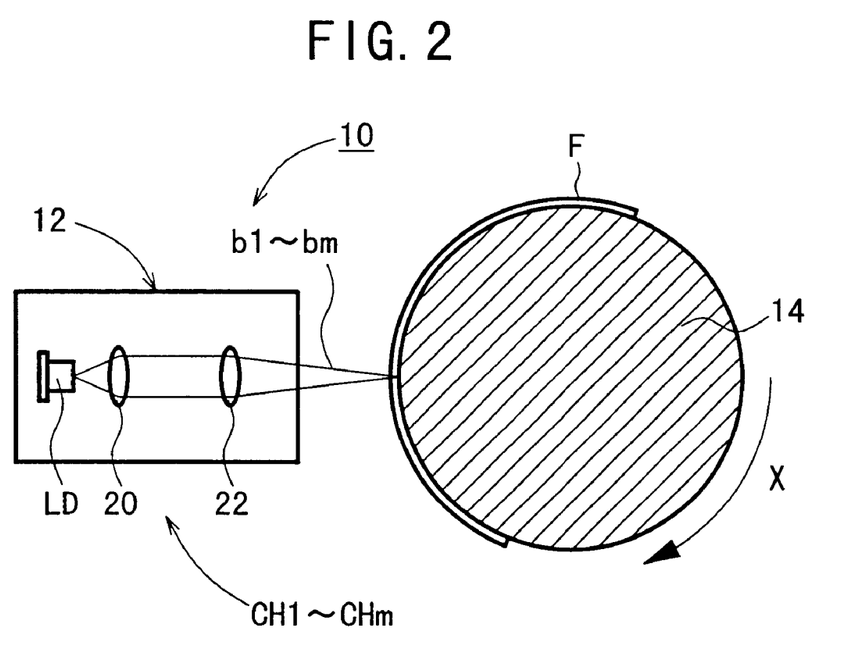
FIG. 2 is a side elevational view of the laser beam recording apparatus shown in FIG. 1.

FIGS. 1 and 2 show a laser beam recording apparatus 10 which incorporates a method of and an apparatus for recording an image by exposure to light beams according to the present invention.

As shown in FIGS. 1 and 2, the laser beam recording apparatus 10 records an area-modulated image on a recording film F mounted on a drum 14 by applying a plurality of laser beams b1 through bm emitted from an exposure head 12 to the recording film F. The area-modulated image is recorded as a two-dimensional image on the recording film F when the drum 14 rotates about its own axis in a main scanning direction indicated by the arrow X and the exposure head 12 moves relatively to the drum 14 in an auxiliary scanning direction indicated by the arrow Y which is substantially perpendicular to the main scanning direction. The area-modulated image is an image made up of a plurality of pixels that are produced on the recording film F by selectively turning on and off the laser beams b1 through bm depending on the image information to be recorded. The pixels take up an area on the recording film F which is commensurate with a desired gradation.

The exposure head 12 comprises a plurality of light source units CH1 through CHm arrayed in the auxiliary scanning direction indicated by the arrow Y. The light source units CH1 through CHm comprise respective laser diodes LDs for emitting the respective laser beams b1 through bm modulated with the image information, respective collimator lenses 20 for collimating the respective laser beams b1 through bm, and respective focusing lenses 22 for focusing the collimated laser beams b1 through bm, respectively, onto the recording film F.

Figure 3:
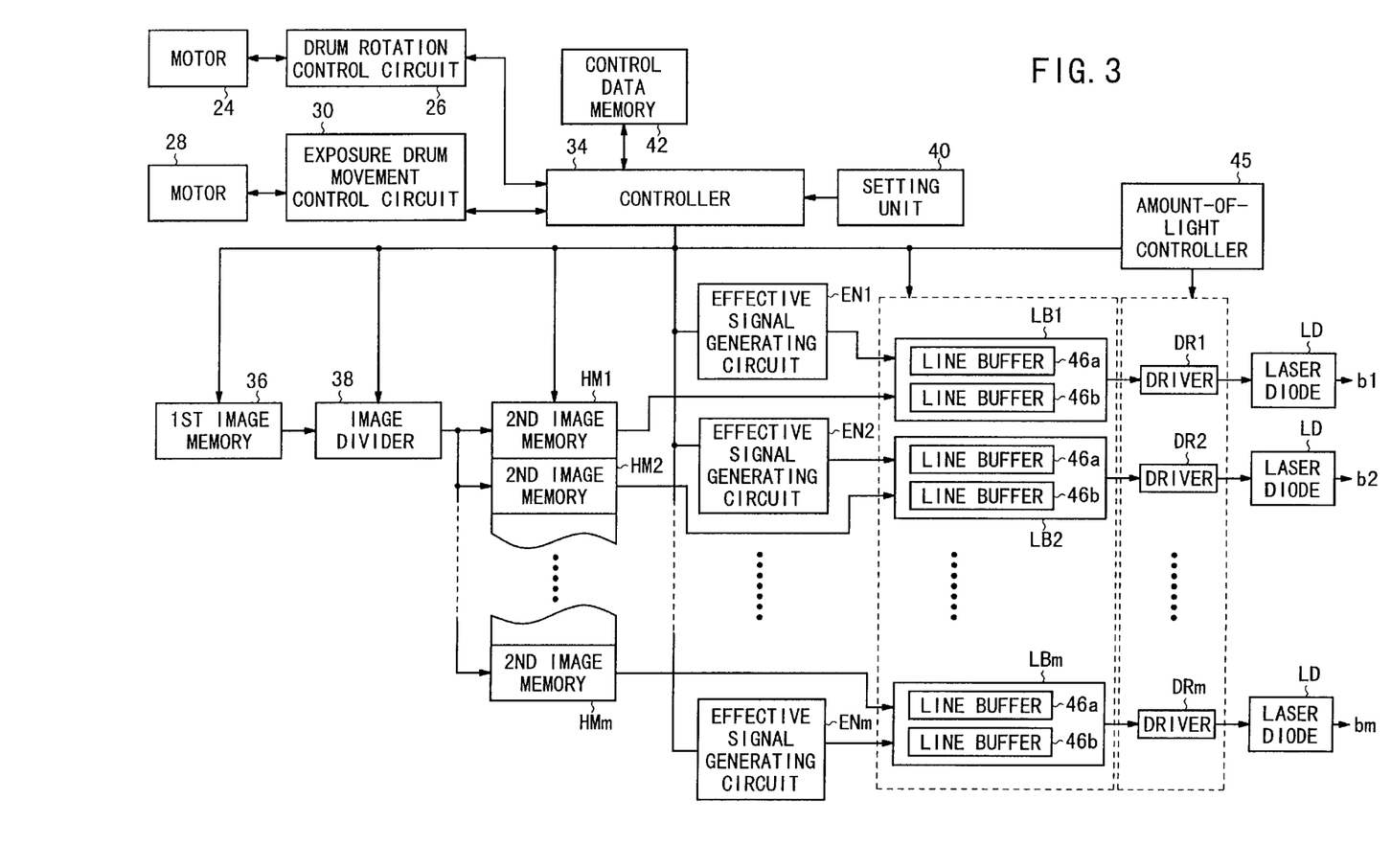
FIG. 3 is a block diagram of a control circuit of the laser beam recording apparatus.

FIG. 3 shows in block form a control circuit of the laser beam recording apparatus 10. As shown in FIG. 3, the control circuit comprises a drum rotation control circuit 26 for controlling a drum rotation motor 24 to rotate the drum 14 and generating main and auxiliary scanning signals based on the angular displacement of the drum 14, an exposure head movement control circuit 30 for controlling an exposure head movement motor 28 to move the exposure head 12 in the auxiliary scanning direction indicated by the arrow Y, and a controller (line number setting means) 34 for controlling operation of the laser beam recording apparatus 10. The main scanning signals are timing signals generated in association with pixels recorded by the laser beams b1 through bm, and the auxiliary scanning signals are timing signals generated in association with respective main scanning lines.

To the controller 34, there are connected a first image memory 36 for storing two-dimensional image data to be recorded on the recording film F, an image divider 38 for dividing two-dimensional image data into two-dimensional image data depending on intervals between the light source units CH1 through CHm in the auxiliary scanning direction indicated by the arrow Y, a plurality of second image memories (image storage means) HM1 through HMm for storing divided two-dimensional image data in association with the respective light source units CH1 through CHm, a plurality of effective signal generating circuits (effective signal generating means) EN1 through ENm for generating effective signals based on the auxiliary scanning signals, and a plurality of buffer memories LB1 through LBm for temporarily storing image data for respective main scanning lines which are supplied from the second image memories HM1 through HMm.

Each of the buffer memories LB1 through LBm comprises two line buffers 46a, 46b. The buffer memories LB1 through LBm are connected respective to drivers (light source driving means) DR1 through DRm whose drive currents are controlled by an amount-of-light controller 45 that is connected to the controller 34. The buffer memories LB1 through LBm supply stored image data to the drivers DR1 through DRm while the buffer memories LB1 through LBm are being supplied with effective signals from the corresponding effective signal generating circuits EN1 through ENm. Based on the image data supplied from the buffer memories LB1 through LBm, the drivers DR1 through DRm supply drive currents to the respective laser diodes LD of the light source units CH1 through CHm to record a desired image on the recording film F.

To the controller 34, there are also connected a setting unit 40 for setting various data for correcting positional misalignments of the laser beams b1 through bm which are caused by manufacturing errors, etc. of the exposure head 12, and a control data memory 42 for storing control data including various data that have been set by the setting unit 40.

The laser beam recording apparatus 10 is basically constructed as described above. Exposure recording methods carried out by the laser beam recording apparatus 10 will be described below. In the laser beam recording apparatus 10, the laser beams b1 through bm produce respective m ($\geq 2$) images A1 through Am that are divided in the auxiliary scanning direction. The produced images A1 through Am are joined together into a large-size image.

First, beam intervals W1 through W(m−1) in the auxiliary scanning direction indicated by the arrow Y on the recording film F between the laser beams b1 through bm emitted from the laser diodes LD of the light source units CH1 through CHm are determined. For example, the beam intervals W1 through W(m−1) can be determined by generating main scanning lines on the recording film F with the laser beams b1 through bm and measuring the distances between the generated main scanning lines. The data of the determined beam intervals W1 through W(m−1) are stored in the control data memory 42.

An exposure recording method according to a first embodiment of the present invention will be described below with reference to FIGS. 4 and 5.

Figure 4:
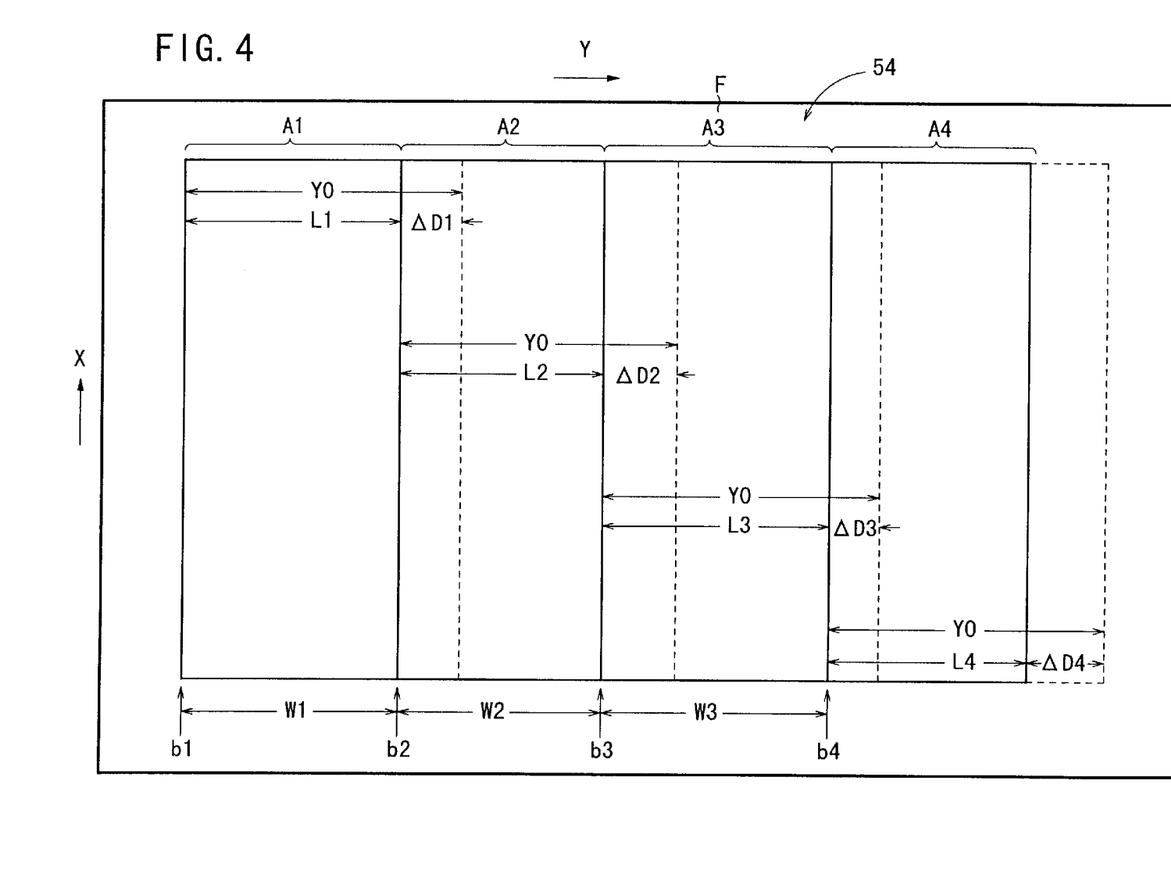
FIG. 4 is a view of an image which is produced by an exposure recording method according to a first embodiment of the present invention.
Figure 5:
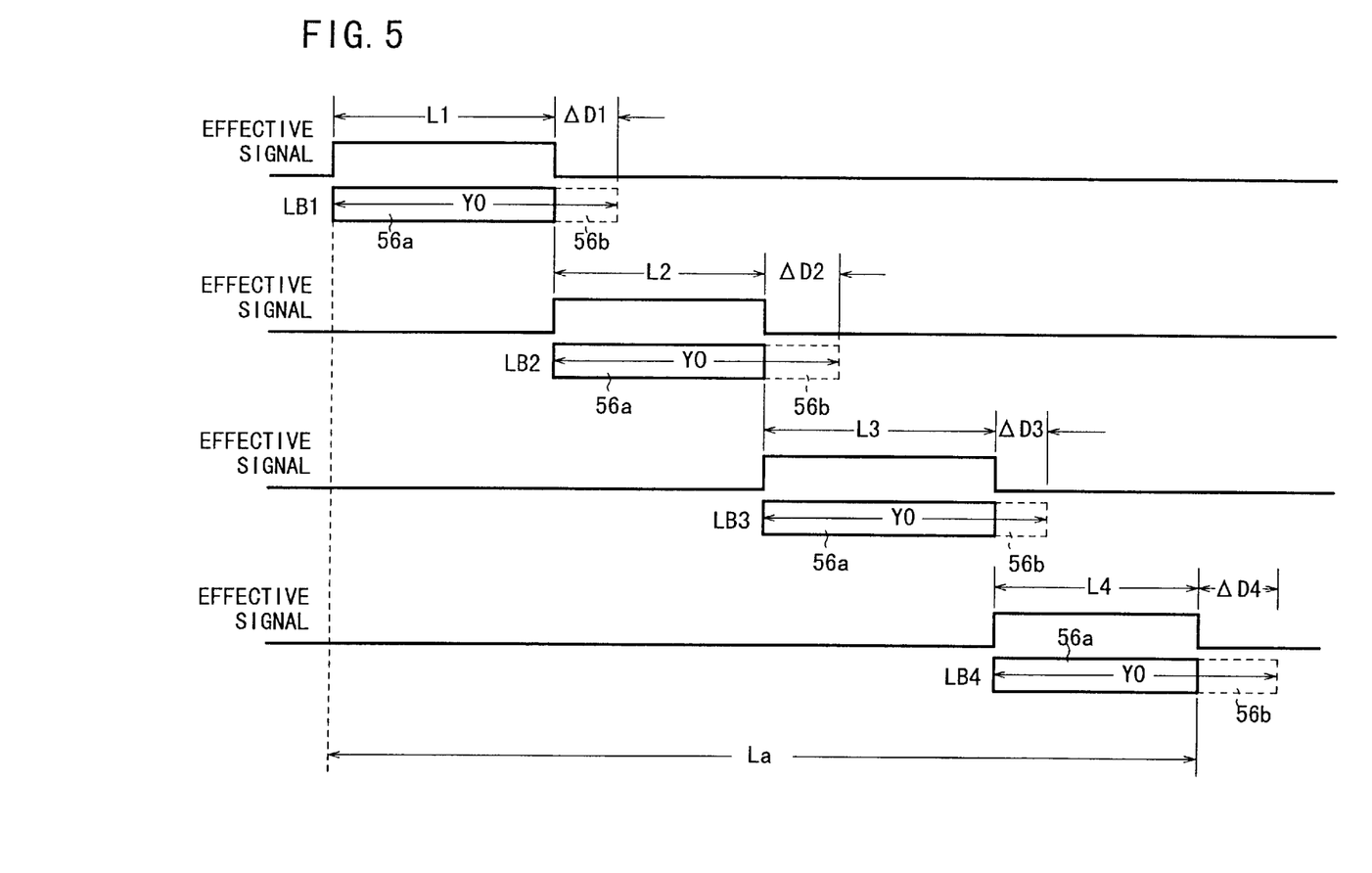
FIG. 5 is a diagram showing the relationship between effective images, ineffective images, and effective signals in the exposure recording method according to the first embodiment of the present invention.

FIG. 4 shows, by way of example, an image 54 to be recorded on the recording film F by exposure to laser beams, the image 54 being divided into four images A1 through A4 in the auxiliary scanning direction indicated by the arrow Y. The divided images A1 through A4 simultaneously start being recorded on the recording film F by the laser beams b1 through b4 emitted from the four light source units CH1 through CH4.

If the distance between the main scanning lines produced by the laser beams b1 through bm in the auxiliary scanning direction indicated by the arrow Y is represented by P, then the number Li (i=1 through m) of the main scanning lines corresponding to the beam interval Wi (i=1 to m−1) is determined as follows:

$$Li = Wi/P \quad (i=1 \text{ through } m-1, m \geq 2) \tag{1}$$

$$Lm = La - (L1 + \ldots + L(m-1)) \tag{2}$$

where La represents the number of all main scanning lines that make up the image 54. These numbers L1 through Lm of main scanning lines are set as the numbers of main scanning lines of the divided images A1 to Am to be recorded by the respective laser beams b1 to bm, and stored in the control data memory 42. Each of the numbers L1 through Lm of main scanning lines should be an integer by dropping any decimals from the result calculated according to the above equations.

The distance that the exposure head 12 is to move in the auxiliary scanning direction indicated by the arrow Y is expressed by a value Y0 ($\geq$L1 through Lm) in terms of the number of main scanning lines. The number $\Delta$Dj of main scanning lines that are not recorded by each of the laser beams b1 through bm after the numbers L1 through Lm of main scanning lines have been recorded is determined as follows:

$$\Delta Dj = Y0 - Lj \quad (j=1 \text{ through } m) \tag{3}$$

and the numbers $\Delta$D1 through $\Delta$Dm of main scanning lines that are not recorded by the laser beams b1 through bm are stored in the control data memory 42.

After the above preparatory process, the controller 34 starts recording the image 54 on the recording film F by exposure to laser beams.

The image divider 38 divides the two-dimensional image data stored in the first image memory 36 into two-dimensional image data corresponding to the divided images A1 through Am with the numbers L1 through Lm of main scanning lines read from the control data memory 42. The divided two-dimensional image data are stored in the second image memories HM1 through HMm, respectively. Each of the second image memories HM1 through HMm has a storage area for storing two-dimensional image data represented by the number of main scanning lines corresponding to the value Y0. The second image memories HM1 through HMm store the two-dimensional image data corresponding to the divided images A1 through Am made up of the numbers L1 through Lm of main scanning lines, successively from the starting addresses in those storage areas.

Then, the two-dimensional image data stored in the second image memories HM1 through HMm are read successively from the starting addresses in the storage areas for each main scanning line, and transferred as divided one-dimensional image data to the buffer memories LB1 through LBm where the one-dimensional image data are stored in the line buffers 46a, 46b. The one-dimensional image data stored in the line buffers 46a, 46b of the buffer memories LB1 through LBm are then alternatively supplied to the drivers DR1 through DRm according to effective signals from the effective signal generating circuits EN1 through ENm.

Specifically, the controller 34 supplies auxiliary scanning signals that are generated when the drum rotation control circuit 26 energizes the drum rotation motor 24 to the effective signal generating circuits EN1 through ENm. The effective signal generating circuits EN1 through ENm then count the supplied auxiliary scanning signals to generate counts LC representing the numbers of main scanning lines, compares the counts LC with the numbers L1 through Lm of main scanning lines supplied from the control data memory 42, and supplies high-level effective signals shown in FIG. 5 to the buffer memories LB1 through LBm while $0 \leq LC \leq L1$ through Lm. The one-dimensional image data of the numbers L1 through Lm of main scanning lines that have been supplied from the second image memories HM1 through HMm to the buffer memories LB1 through LBm are applied as effective image data 56a to the drivers DR1 through DRm. Based on the effective image data 56a, the drivers DR1 through DRm control the respective laser diodes LD to emit respective laser beams b1 through bm, which are applied via the collimator lenses 20 and the focusing lenses 22 to the recording film F to record the divided images A1 through A4 represented by the effective image data 56a on the recording film F.

If the counts LC are greater than the numbers L1 through Lm of main scanning lines (LC>L1 through Lm), then the effective signal generating circuits EN1 through ENm make the effective signals lower in level and supply the lower-level effective signals to the buffer memories LB1 through LBm. At this time, the one-dimensional image data of the numbers L1 through Lm of main scanning lines that have been supplied from the second image memories HM1 through HMm to the buffer memories LB1 through LBm are not outputted to the drivers DR1 through DRm, but become ineffective image data 56b, as shown in FIG. 5. Therefore, images made up of the numbers L1 through Lm of main scanning lines are not recorded on the recording film F by the light source units CH1 through CHm.

As described above, the divided images A1 through A4 simultaneously start being recorded on the recording film F by the light source units CH1 through CHm, producing the image 54 where the images A1 through Am are well joined to each other with the numbers L1 through Lm of main scanning lines.

An exposure recording method according to a second embodiment of the present invention will be described below with reference to FIGS. 6 and 7.

Figure 6:
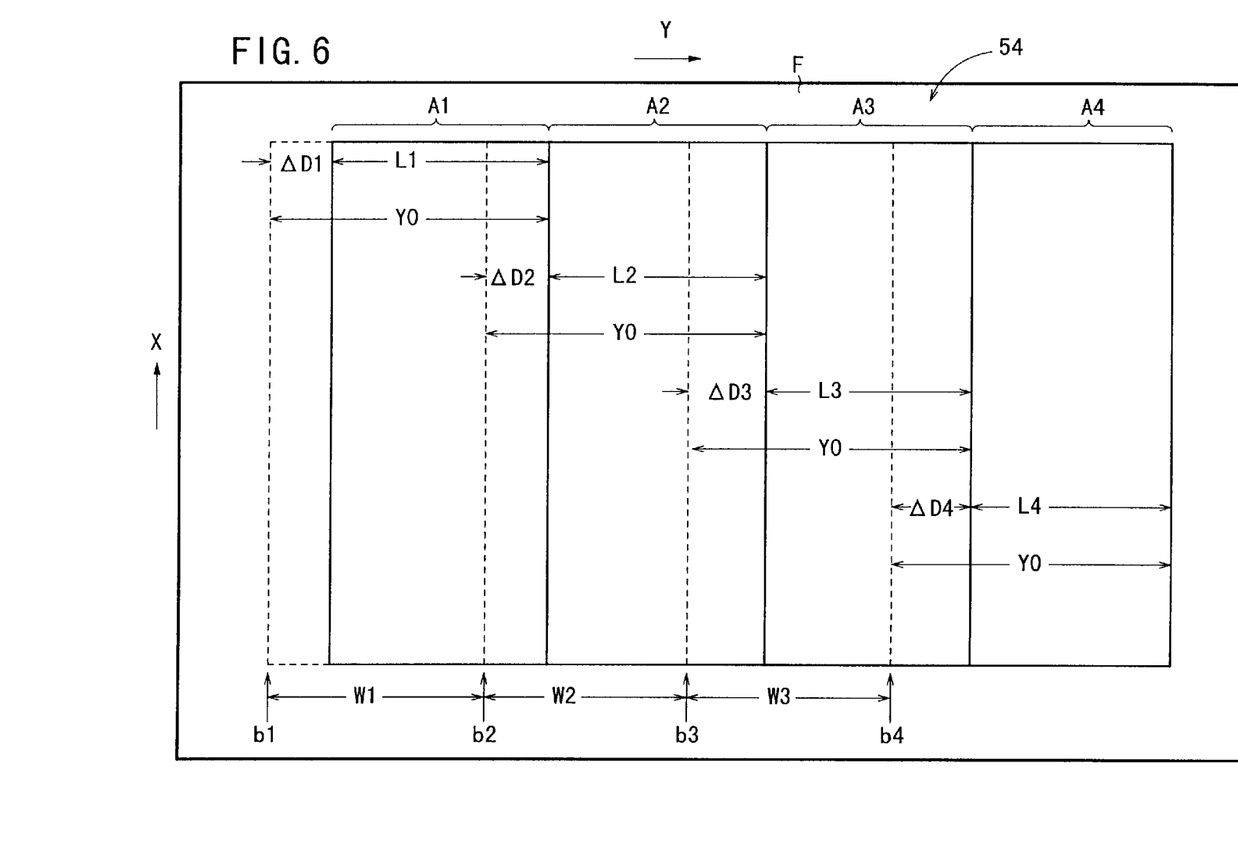
FIG. 6 is a view of an image which is produced by an exposure recording method according to a second embodiment of the present invention.

FIG. 6 shows, by way of example, an image 54 to be recorded on the recording film F by exposure to laser beams, the image 54 being divided into four images A1 through A4 in the auxiliary scanning direction indicated by the arrow Y. The divided images A1 through A4 simultaneously end being recorded on the recording film F by the laser beams b1 through b4 emitted from the four light source units CH1 through CH4.

The number Li (i=1 through m) of the main scanning lines corresponding to the beam interval Wi (i=1 to m−1) is determined according to the above equations (1) and (2), and stored in the control data memory 42.

The number $\Delta Dj$ of main scanning lines that are not initially recorded by respective laser beams b2 through bm is determined, using the above value Y0 in terms of the number of main scanning lines, as follows:

$$\Delta Dj = Y_0 - L(j-1) \quad (j=2 \text{ through } m) \qquad (4)$$

The number $\Delta Dj$ of main scanning lines that are not initially recorded by the laser beam b1 is set to a desired value depending on the position where an image begins to be recorded by the laser beam b1. The numbers $\Delta D1$ through $\Delta Dm$ of main scanning lines are stored in the control data memory 42.

Then, the image divider 38 divides the two-dimensional image data into two-dimensional image data with the numbers L1 through Lm of main scanning lines calculated according to the equations (1) and (2). The divided two-dimensional image data are stored in the second image memories HM1 through HMm, respectively. Specifically, the second image memories HM1 through HMm store two-dimensional data corresponding to the divided images A1 through Am made up of the numbers L1 through Lm of main scanning lines, successively from addresses that are shifted from starting addresses by the numbers AD1 through ADm of main scanning lines.

The effective signal generating circuits EN1 through ENm count the auxiliary scanning signals supplied from the controller 34 to generate counts LC representing the numbers of main scanning lines, and compares the counts LC with the numbers AD1 through ADm of main scanning lines supplied from the control data memory 42. While $0 \leq LC < \Delta D1$ through $\Delta Dm$, the effective signal generating circuits EN1 through ENm make the effective signals lower in level and supply the lower-level effective signals to the buffer memories LB1 through LBm. At this time, the one-dimensional image data of the numbers L1 through Lm of main scanning lines that have been supplied from the second image memories HM1 through HMm to the buffer memories LB1 through LBm are not outputted to the drivers DR1 through DRm. Therefore, no images are recorded on the recording film F during this time.

Figure 7:
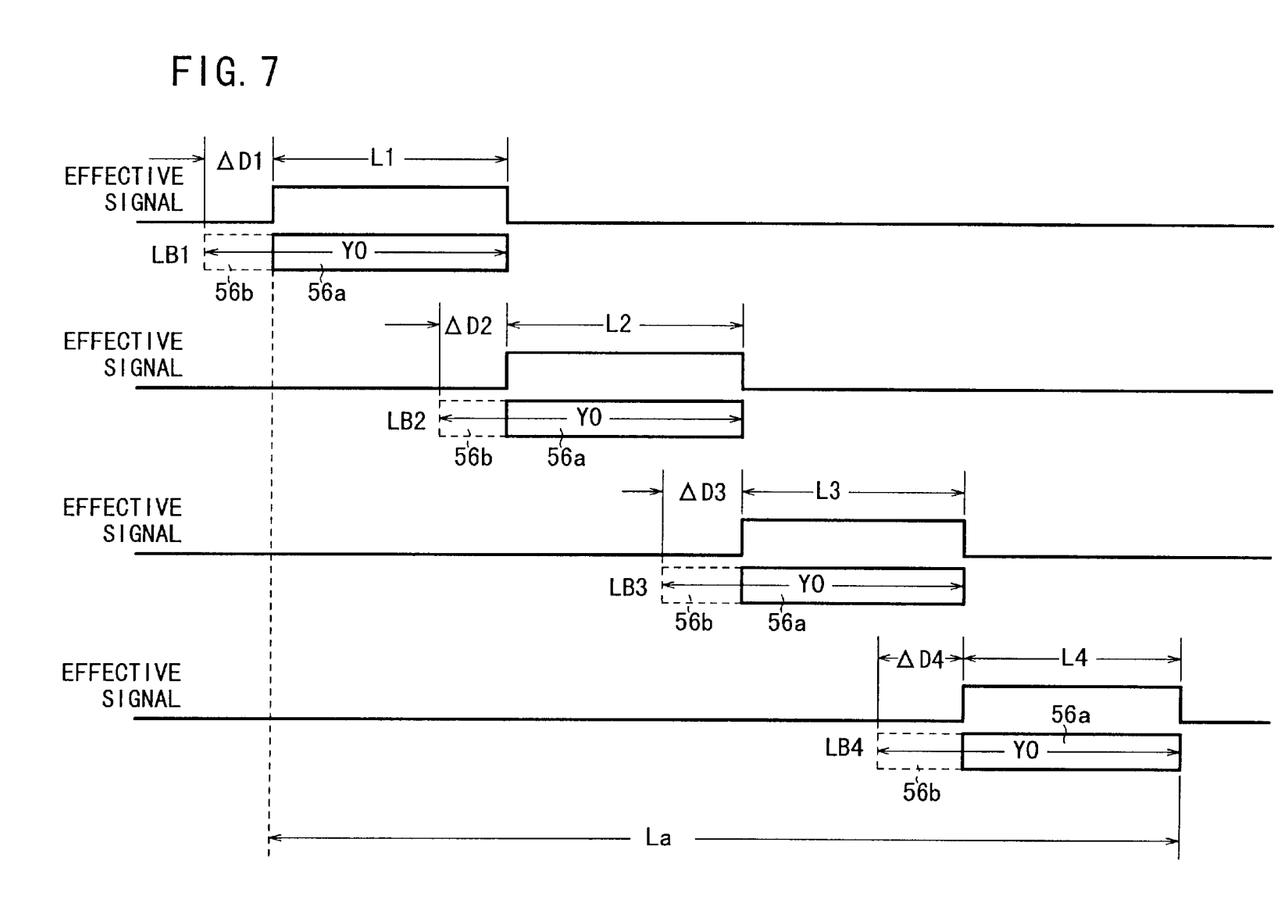
FIG. 7 is a diagram showing the relationship between effective images, ineffective images, and effective signals in the exposure recording method according to the second embodiment of the present invention.

If the counts LC are equal to or greater than the numbers $\Delta D1$ through $\Delta Dm$ of main scanning lines (LC $\geq \Delta D1$ through $\Delta Dm$), then the effective signal generating circuits EN1 through ENm supplies high-level effective signals shown in FIG. 7 to the buffer memories LB1 through LBm. The one-dimensional image data of the numbers L1 through Lm of main scanning lines that have been supplied from the second image memories HM1 through HMm to the buffer memories LB1 through LBm are applied as effective image data 56a to the drivers DR1 through DRm. Based on the effective image data 56a, the divided images A1 through A4 are recorded on the recording film F. Thereafter, the recording process is completed.

In the above embodiments, the one-dimensional image data stored in the buffer memories LB1 through LBm are supplied to the drivers DR1 through DRm only when the effective signal generating circuits EN1 through ENm supplies output high-level effective signals. Therefore, ineffective image data 56b supplied from the second image memories HM1 through HMm to the buffer memories LB1 through LBm may be any image data. Consequently, when the effective image data 56a are to be written, it is not necessary to clear the second image memories HM1 through HMm, and hence the image processing operation is made faster.

Alternatively, instead of generating the effective signals in the manner described above, the ineffective image data 56a may be written as mask data of 0 or 1 that does not contribute to the image recording process in the second image memories HM1 through HMm.

According to the present invention, as described above, images simultaneously start or end being recorded on a photosensitive medium in an auxiliary scanning direction with a plurality of light beams, so that a high-quality image can be recorded at a high speed in a desired recording position on the photosensitive medium. Mechanical or optical adjustments are not made, but the number of main scanning lines recorded in the auxiliary scanning direction with the light beams is adjusted depending on the intervals between the light beams on the photosensitive medium, to join images recorded on the photosensitive mediums in the auxiliary scanning direction into a high-quality image with a simple arrangement.

Although certain preferred embodiments of the present invention have been shown and described in detail, it should be understood that various changes and modifications may be made therein without departing from the scope of the appended claims.

What is claimed is:

1. A method of recording a two-dimensional image on a photosensitive medium by exposure to light beams which are emitted from a plurality of light sources arrayed in an auxiliary scanning direction and applied to scan the photosensitive medium in a main scanning direction and the auxiliary scanning direction, comprising:

dividing the two-dimensional image into a plurality of divided two-dimensional images in the auxiliary scanning direction;

setting the numbers of main scanning lines to be recorded or not to be recorded for the two-dimensional images with the light sources, depending on intervals in the auxiliary scanning direction on the photosensitive medium between the light beams emitted from adjacent ones of the light sources; and simultaneously starting or ending to record the two-dimensional images according to the set numbers of scanning lines, wherein each of the light sources records a continuous divided two-dimensional image.

2. A method according to claim 1, wherein when the two-dimensional images simultaneously start to be recorded by the light beams emitted from the light sources, the number $Li$ of main scanning lines to be recorded by the light beams is determined by:

$$Li = Wi/P \; (i=1 \text{ through } m-1, m \geq 2)$$

$Lm = La - (Li + \ldots + L(m-1))$ ($La$: the number of all main scanning lines that make up the two-dimensional image) where $Wi$ represents the interval in the auxiliary scanning direction on the photosensitive medium between m light beams emitted from adjacent ones of the light sources, P represents the distance between the main scanning lines to be recorded, and $Y0$ represents the number of main scanning lines that can be recorded by the light beams, and the number $\Delta Dj$ of main scanning lines not to be recorded by the light beams is determined by:

$$\Delta Dj = Y0 - Lj \; (j=1 \text{ through } m)$$

said method further comprising:

recording two-dimensional images of the number $Lj$ ($j=1$ through m) of main scanning lines with the light beams; and thereafter, scanning the photosensitive medium in the auxiliary scanning direction without recording two-dimensional images of the number $\Delta Dj$ ($j=1$ through m) of main scanning lines.

3. A method according to claim 1, wherein when the two-dimensional images simultaneously end to be recorded by the light beams emitted from the light sources, the number $Li$ of main scanning lines to be recorded by the light beams is determined by:

$$Li = W(i-1)/P \; (i=2 \text{ through } m-1, m \geq 2)$$

$Li = La - (L2 + \ldots + Lm)$ ($La$: the number of all main scanning lines that make up the two-dimensional image) where $Wi$ represents the interval in the auxiliary scanning direction on the photosensitive medium between m light beams emitted from adjacent ones of the light sources, P represents the distance between the main scanning lines to be recorded, and $Y0$ represents the number of main scanning lines that can be recorded by the light beams, and the number $\Delta Dj$ of main scanning lines not to be recorded by the light beams is determined by:

$$\Delta Dj = Y0 - Lj \; (j=1 \text{ through } m)$$

said method further comprising:

recording scanning the photosensitive medium in the auxiliary scanning direction without recording two-dimensional images of the number $\Delta Dj$ ($j=1$ through m) of main scanning lines; and thereafter, recording two-dimensional images of the number $Lj$ ($j=1$ through m) of main scanning lines with the light beams.

4. An apparatus for recording a two-dimensional image on a photosensitive medium by exposure to light beams which are emitted from a plurality of light sources arrayed in an auxiliary scanning direction and applied to scan the photosensitive medium in a main scanning direction and the auxiliary scanning direction, comprising:

line number setting means for setting the numbers of main scanning lines to be recorded or not to be recorded for the two-dimensional images with the light sources, depending on intervals in the auxiliary scanning direction on the photosensitive medium between the light beams emitted from adjacent ones of the light sources;

an image divider for dividing the two-dimensional image into a plurality of divided two-dimensional images in the auxiliary scanning direction, based on the numbers of main scanning lines to be recorded;

image storage means for storing the divided two-dimensional images for the respective light sources; and light source driving means for energizing said light sources based on said two-dimensional images;

the arrangement being such that the two-dimensional images are read from said image storage means and supplied to said light source driving means based on the numbers of main scanning lines to be recorded or not to be recorded, wherein each of the light sources records a continuous divided two-dimensional image.

5. An apparatus according to claim 4, wherein said image storage means comprises means for storing ineffective images in auxiliary scanning ranges covered by said light sources in addition to the divided two-dimensional images, further comprising:

effective signal generating means for generating effective signals to remove said ineffective images and selectively supply said two-dimensional images to said light source driving means.

6. An apparatus according to claim 5, further comprising a line buffer for storing one-dimensional images for each of said main scanning lines which make up said two-dimensional images read from said image storage means, wherein said effective signal generating means reads the one-dimensional images from said line buffer and supplies the one-dimensional images to said light source driving means.

7. An apparatus according to claim 4, wherein said image storage means stores ineffective images in auxiliary scanning ranges covered by said light sources as mask data that does not contribute to image recording process, in addition to said divided two-dimensional images.

8. An apparatus according to claim 4, wherein said light sources are laser sources for emitting laser beams.

9. An apparatus according to claim 4, wherein the recording of said plurality of two-dimensional images is started or ended simultaneously.

* * * * *